United States Patent
Eng et al.

(10) Patent No.: US 9,500,094 B1
(45) Date of Patent: Nov. 22, 2016

(54) TURBINE WITH RADIAL ACTING SEAL

(71) Applicants: Darryl S Eng, Palm Beach Gardens, FL (US); Todd A Ebert, West Palm Beach, FL (US)

(72) Inventors: Darryl S Eng, Palm Beach Gardens, FL (US); Todd A Ebert, West Palm Beach, FL (US)

(73) Assignee: S & J DEISGN, LLC, Jupiter, FL (US)

( * ) Notice: Subject to any disclaimer, the term of this patent is extended or adjusted under 35 U.S.C. 154(b) by 565 days.

(21) Appl. No.: 14/030,102

(22) Filed: Sep. 18, 2013

Related U.S. Application Data (60) Provisional application No. 61/814,992, filed on Apr. 23, 2013.

(51) Int. Cl.
*F01D 11/00* (2006.01)

(52) U.S. Cl.
CPC .................................. *F01D 11/001* (2013.01)

(58) Field of Classification Search
CPC .... F01D 11/001; F01D 11/025; F01D 11/00; F01D 11/16; F05D 2240/56; F16J 15/3288
See application file for complete search history.

(56) References Cited

U.S. PATENT DOCUMENTS

| | | | | |
|---|---|---|---|---|
| 6,168,162 B1* | 1/2001 | Reluzco | ............... | F16J 15/3288 277/355 |
| 6,168,377 B1* | 1/2001 | Wolfe | ................... | F01D 11/001 415/174.2 |
| 7,516,962 B2* | 4/2009 | Boeck | ................... | F01D 11/001 277/355 |
| 8,133,014 B1* | 3/2012 | Ebert | .................... | F01D 11/025 415/173.3 |
| 2005/0104300 A1* | 5/2005 | Hogg | .................... | F01D 11/025 277/411 |
| 2006/0285970 A1* | 12/2006 | Boeck | ................... | F01D 11/001 415/173.1 |
| 2013/0234397 A1* | 9/2013 | Uehara | .................... | F16J 15/32 277/353 |

* cited by examiner

*Primary Examiner* — Igor Kershteyn
*Assistant Examiner* — Eldon Brockman
(74) *Attorney, Agent, or Firm* — John Ryznic (57) ABSTRACT

A floating brush seal in a rim cavity of a turbine in a gas turbine engine, where the floating brush seal includes a seal holder in which the floating brush seal floats, and a expandable seal that fits within two radial extending seal slots that maintains a seal with radial displacement of the floating brush seal and the seal holder.

16 Claims, 8 Drawing Sheets

TURBINE WITH RADIAL ACTING SEAL

CROSS-REFERENCE TO RELATED APPLICATIONS

This application claims the benefit to a Provisional Application 61/814,992 filed on Apr. 23, 2013 and entitled TURBINE WITH RADIAL ACTING SEAL.

GOVERNMENT LICENSE RIGHTS

This invention was made with Government support under contract number DE-FC26-05NT42644 awarded by Department of Energy. The Government has certain rights in the invention.

BACKGROUND OF THE INVENTION

Field of the Invention

The present invention relates generally to a gas turbine engine, and more specifically to a radial acting seal located in the turbine section between the stator vane and the rotor.

Description of the Related Art Including Information Disclosed Under 37 CFR 1.97 and 1.98

In an industrial gas turbine engine, a turbine includes three or four rows or stages of stator vanes and rotor blades that guide and react with a hot gas flow to convert the energy from the gas flow into mechanical work by driving the turbine rotor shaft from which the rotor blades are connected to. As the hot gas flow passes through the stages, the pressure decreases as energy is extracted by the rotor blades. The rotor blades are positioned between adjacent stages of stator vanes. A seal is required between the rotor and the stator to prevent hot gas flow from leaking into the rim cavity or other areas outside of the main flow path in which the elevated temperature of the gas flow can affect other parts of the turbine such as the rotor disks. Also, the seals between the stages of vanes and blades prevent leakage of the higher pressure gas flow into a lower pressure gas flow at a downstream stage of the turbine.

Turbine stages typically use labyrinth seals or brush seals to limit leakage flow. Labyrinth seals provide a good seal at high rotational speeds and can allow for slight amounts of rub against a honey comb surface. Brush seals make good seals for low rotational speeds, but wear relatively fast at very high speeds. One major problem with an industrial gas turbine engine and these interstage seals in the turbine is when transients occur. In a transient, the engine operate from a cold condition to a steady state operating condition, or goes from one condition to another condition in which the rotor shaft and the casing changes temperatures that cause relative radial displacement between the shaft and casing. This relative radial displacement will cause significant gap clearances in the interstage seals to open or close such that the leakage flow is significantly increased or a rubbing occurs that will damage or wear out the seal prematurely.

One example of this transient is when an engine is shut down from a steady state operation to a stopped condition. The casing will cool quicker than the rotor shaft, so the casing will close down on the rotor shaft. In another transient condition, the stopped engine will be restarted. The casing will heat up quicker than the rotor shaft so that the casing will thermally grow in a radial direction faster than the rotor shaft will. Thus, the clearance gaps during transients change such that large gaps are produced or rubbing is produced.

U.S. Pat. No. 8,133,014 issued to Ebert et al. on Mar. 13, 2012 and entitled TRIPLE ACTING RADIAL SEAL (the entire disclosure being incorporated herein by reference) discloses a triple acting radial seal used as an interstage seal assembly in a gas turbine engine, where the seal assembly includes an interstage seal support extending from a stationary inner shroud of a vane ring, the interstage seal support includes a larger annular radial inward facing groove in which an outer annular floating seal assembly is secured for radial displacement, and the outer annular floating seal assembly includes a smaller annular radial inward facing groove in which an inner annular floating seal assembly is secured also for radial displacement. A compliant seal is secured to the inner annular floating seal assembly. The outer annular floating seal assembly encapsulates the inner annular floating seal assembly which is made from a very low alpha material in order to reduce thermal stress.

BRIEF SUMMARY OF THE INVENTION

A gas turbine engine with a stator vane positioned between two stages of rotor blades that from a rim cavity with a rotor, where a floating brush seal forms a seal between the stator vane inner endwall and the rotor. The floating brush seal is secured to a floating seal holder that is displaceable in a radial direction within a radial slot formed within an extension of the inner endwall. Radial extending and opposed seal slots are formed within the endwall extension and the floating seal holder in which a second seal with expandable members formed on both ends is secured. When radial displacement between the floating brush seal holder and the endwall extension occurs, the second seal with expandable members maintains a tight seal within the two opposed radial slots.

The expandable members on the ends of the second seal can have several different shapes that include a C-shaped seal, an E-shaped seal, a spring energized seal, a spring loaded seal, or a brush seal.

DETAILED DESCRIPTION OF THE INVENTION

Figure 1:
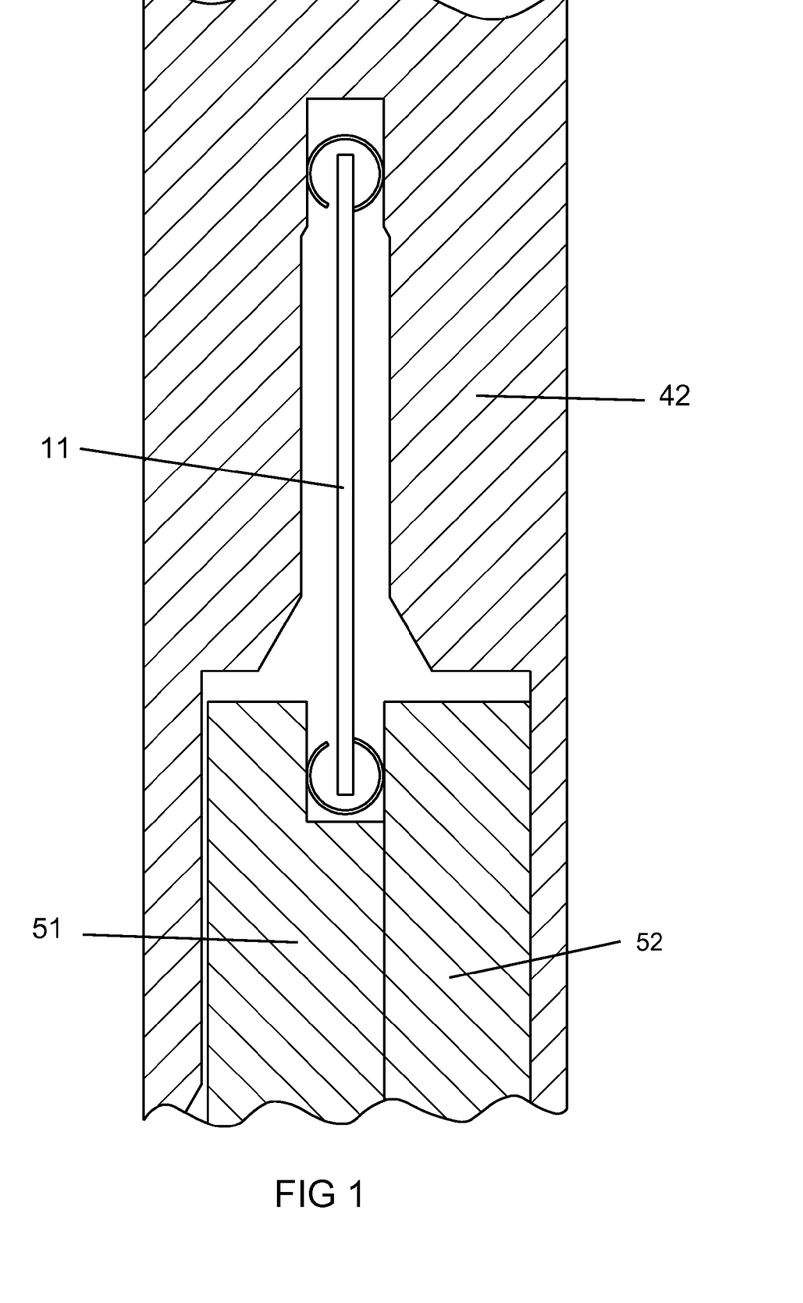
FIG. 1 shows a first embodiment of a radial seal for a turbine of the present invention.

The present invention is a radial seal for a turbine formed between an inner shroud of a stator vane and an outer surface of the rotor disk. FIG. 1 of the Ebert U.S. Pat. No. 8,133,014 shows an encapsulated brush seal holder 51 that is radially displaceable within a floating interstage seal support 41 and 42 with a static-static seal 48 that maintains a seal between the brush seal holder 51 and the seal support 41 and 42 during relative displacement in a radial direction. FIG. 1 shows the seal support 42 as one piece but it can be two pieces. The present invention discloses six different designs for a static-static seal that will work in this arrangement.

FIG. 1 shows a first embodiment of the seal 11 that fits in the seal slots formed within the encapsulated brush seal holder 51 and 52 (this can be one piece) and the floating interstage seal support (or stator vane inner diameter endwall extension) 42. Seal 11 includes a seal plate with two C-shaped seals on both ends within one end of the C-seal secured to the end of the seal plate and the other end free to move inward or outward to form a tight fit within the seal slots. The C-seal 11 has a low sealing load and is considered to be the most cost effective seal of the six embodiments of the present invention for larger pressure differentials configurations across a seal plate which may deform the seal ends.

Figure 2:
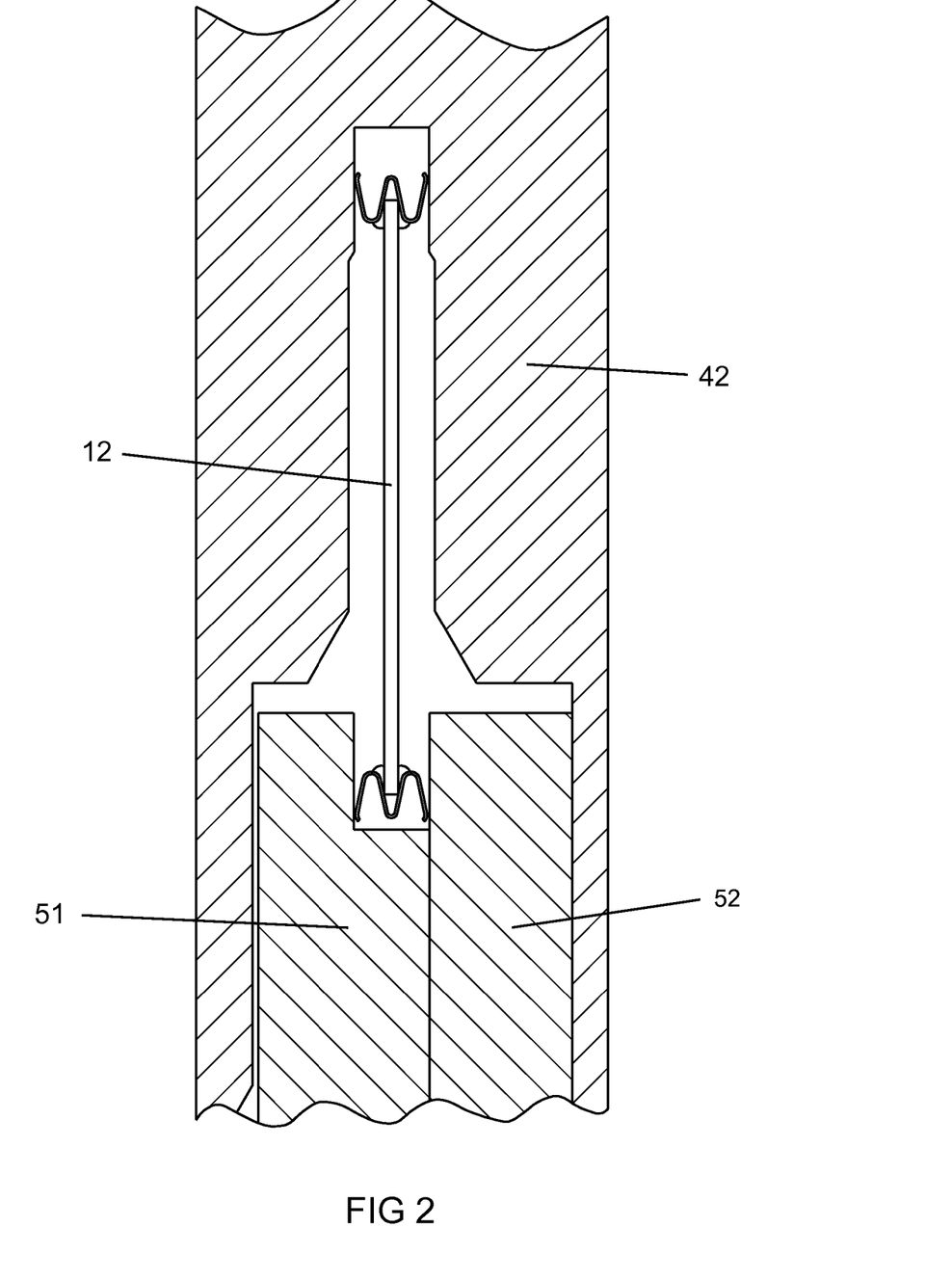
FIG. 2 shows a second embodiment of a radial seal for a turbine of the present invention.

FIG. 2 shows a second embodiment of the seal 12 and is an E-seal 12 with a seal plate having two E-seals on the ends. The E-seal 12 can flex inward and outward to maintain a tight fit within the seal slots of the brush seal holder 51 and the floating interstage seal support (ID endwall extension) 42. The E-seal 12 provides for lower sealing loads during installation and is energized as air flows into upper and lower chambers.

Figure 3:
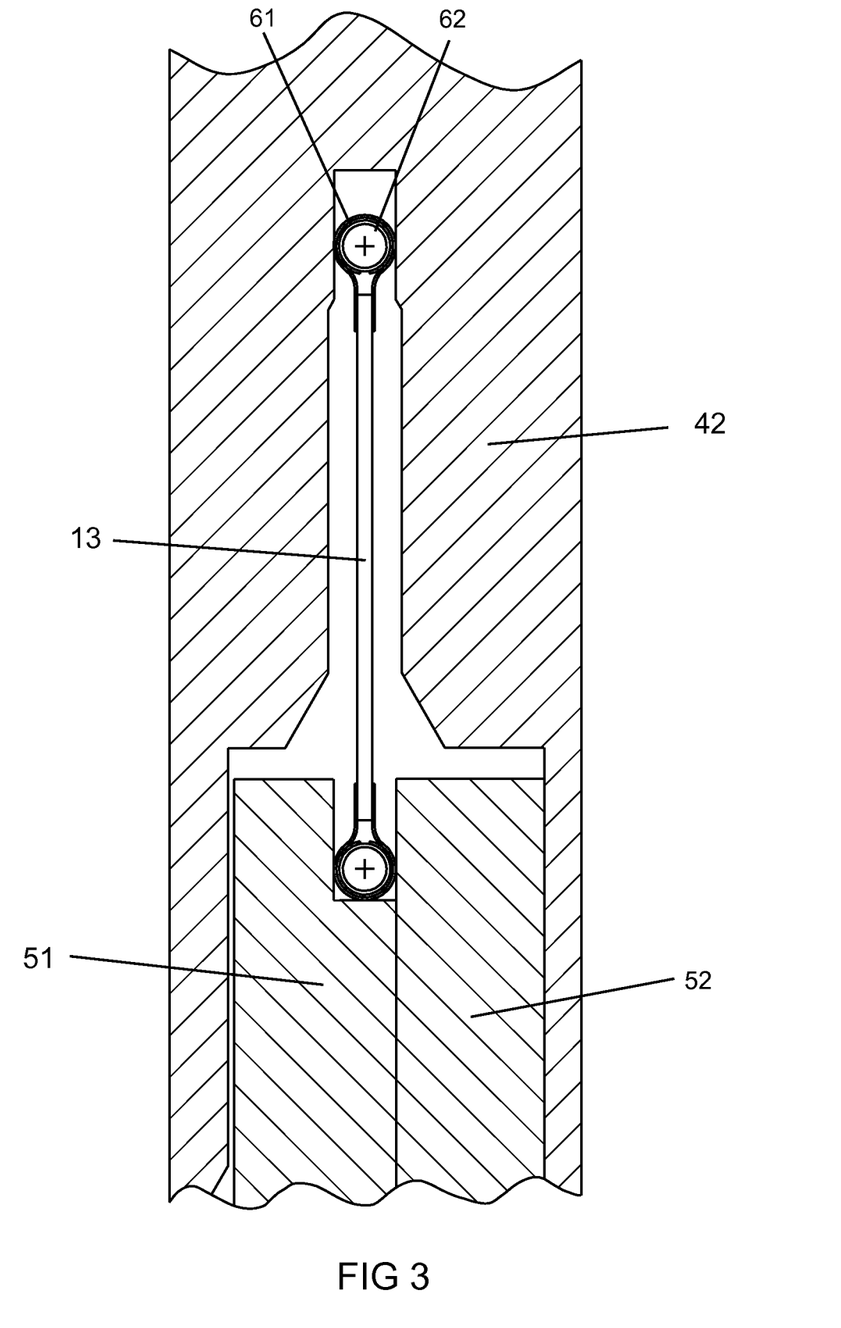
FIG. 3 shows a third embodiment of a radial seal for a turbine of the present invention.

FIG. 3 shows a third embodiment of the seal and is a spring energized seal 13 has a large sealing load of over 2,000 lbs/linear inch and thus would be harder to install but provides a superior sealing configuration (lowest leakage) and can handle the larger pressure differentials across the seal plate. The spring energized seal 13 includes an inner piece 61 that is a wire wrapped around to form a coil that is then encased by an outer piece 62 that retains the inner piece 61 in its form and secures it to the seal plate.

Figure 4:
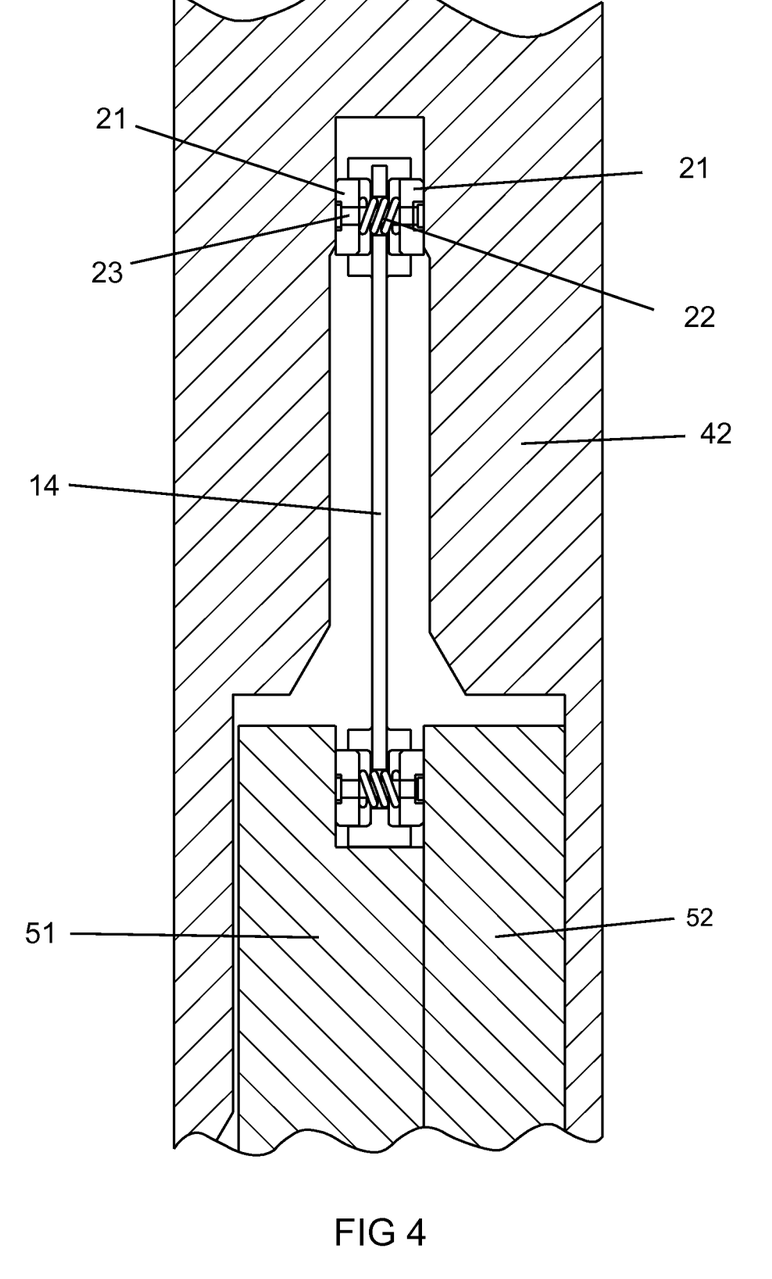
FIG. 4 shows a fourth embodiment of a radial seal for a turbine of the present invention.

FIG. 4 shows a fourth embodiment of the seal and is a spring loaded seal 14 with each end having two seal plates 21 biased to the outside by a spring 22 with a retaining pin 23 securing the seals together.

Figure 5:
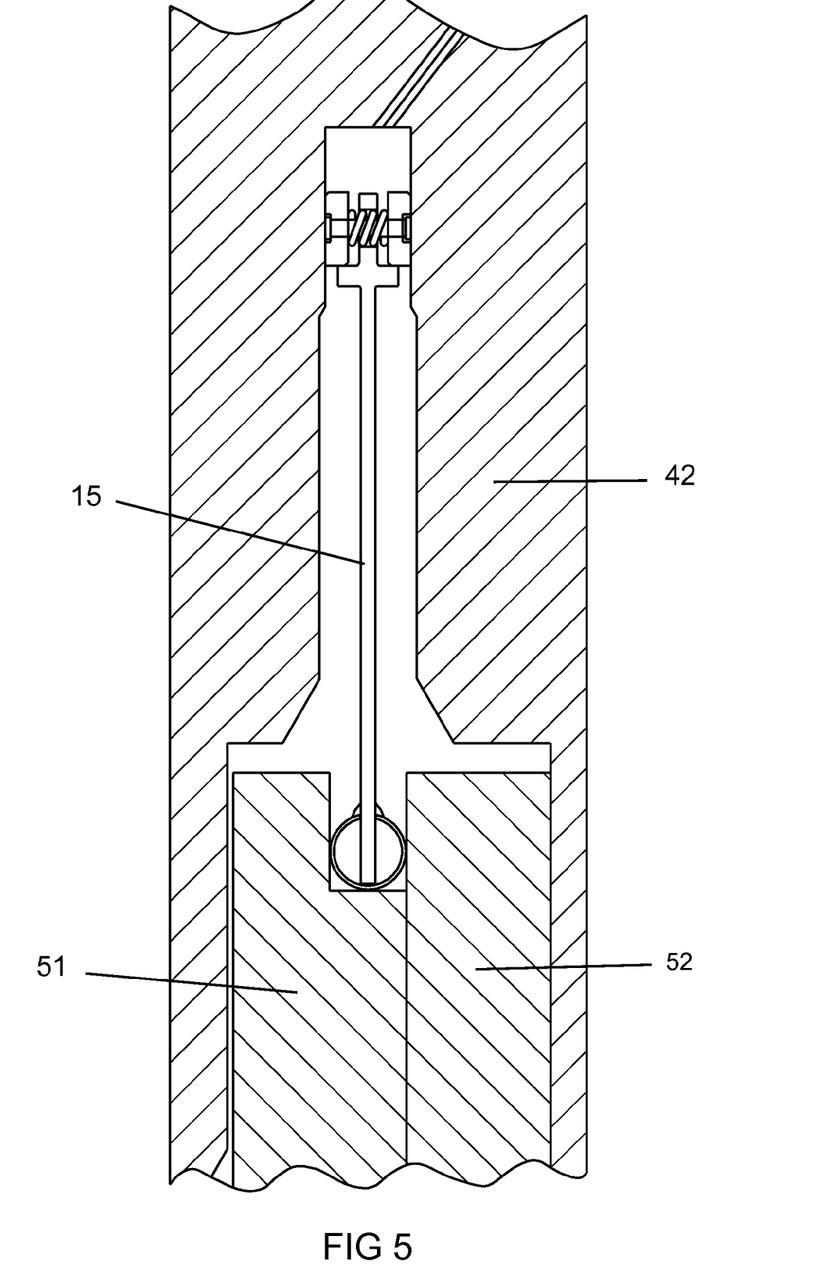
FIG. 5 shows a fifth embodiment of a radial seal for a turbine of the present invention.

FIG. 5 shows a fifth embodiment of the seal and is a pressure energized seal 15 with a spring loaded seal of FIG. 4 of an upper end of the seal plate and a spring energized seal of FIG. 3 on the lower end of the seal plate. This provides for optimal low leakage seal on the inner diameter and a seal on the outer diameter that installs easily on an interstage seal (ISS).

Figure 6:
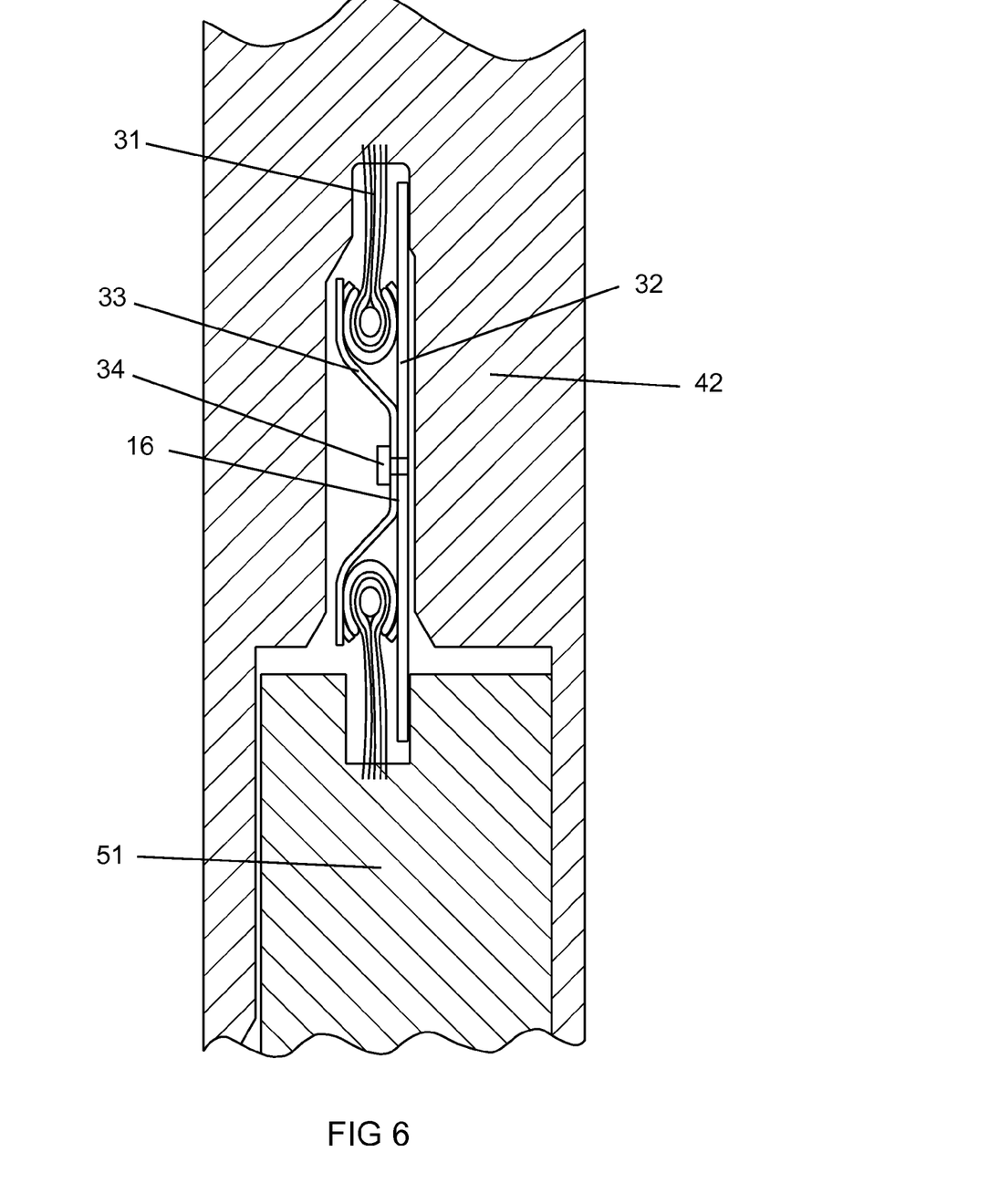
FIG. 6 shows a sixth embodiment of a radial seal for a turbine of the present invention.

FIG. 6 shows a sixth embodiment of the seal and is a brush seal 16 with a brush seal 31 secured to a backing plate 32 by a brush seal bracket 33 and a fastener 34 on both ends of the seal plate. The brush seal 16 can accommodate closedown and is self-centering.

Figure 7:
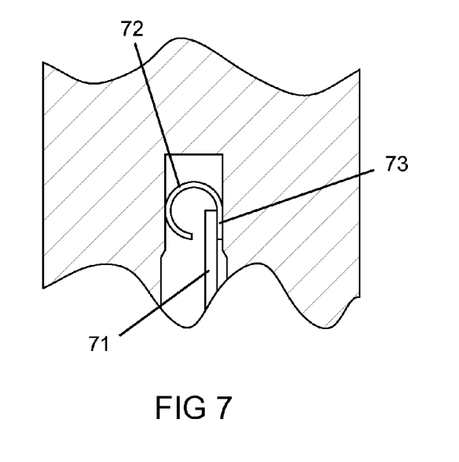
FIG. 7 shows a seventh embodiment of a radial seal for a turbine of the present invention.
Figure 8:
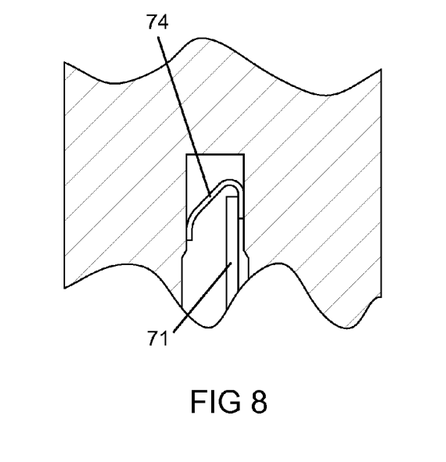
FIG. 8 shows an eighth embodiment of a radial seal for a turbine of the present invention.
Figure 9:
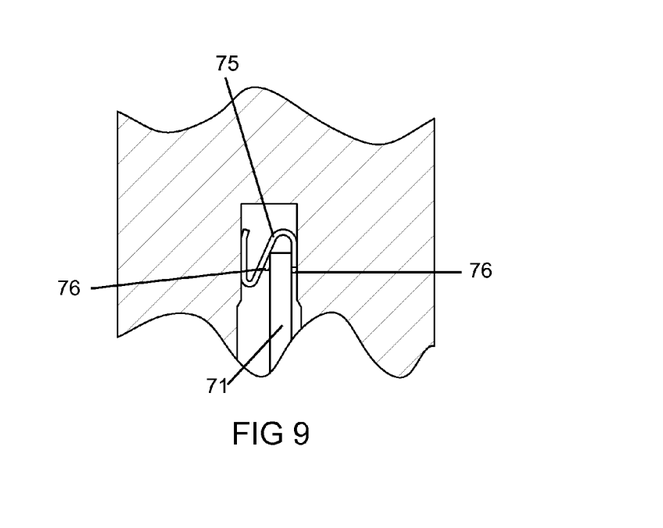
FIG. 9 shows a ninth embodiment of a radial seal for a turbine of the present invention.

FIGS. 7 through 9 show an embodiment of the invention in which a high pressure on one side of the seal will not cause significant deformation such that the seals do not work properly. In FIG. 7, the seal 72 is similar to that in the FIG. 1 embodiment except that one side is rigid. The C-shaped seal 72 is bonded on the right side of the seal plate 71 at location 73. If a high pressure acts of the left side of the seal plate 71, the seal will be pushed against the right side of the slot and will not deform the C-shaped seal member 72 because no springiness is formed on the right side. FIG. 8 shows a similar design for an elbow shaped seal 74. FIG. 9 shows a similar design for a W-shaped seal 75. The W-shaped seal 75 is bonded to the seal plate 71 are two locations 76.

Figure 10:
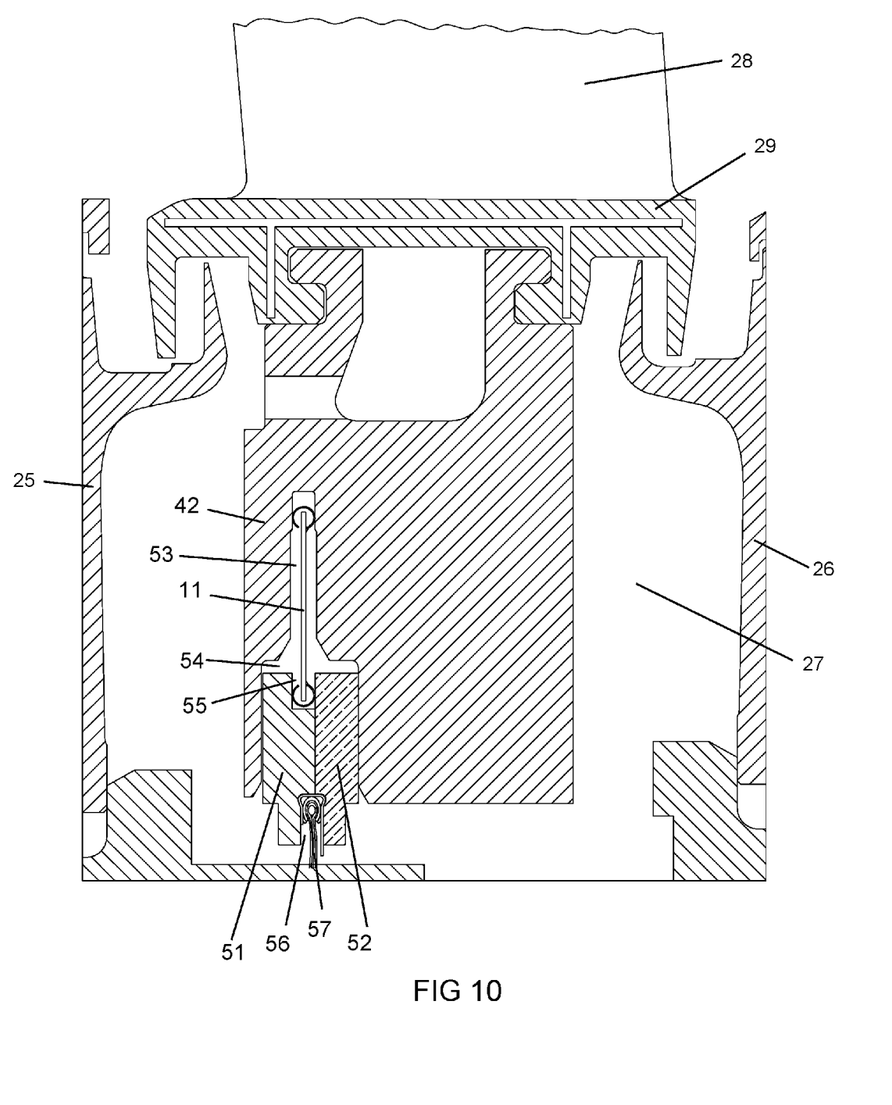
FIG. 10 shows a turbine with the radial acting seal of the FIG. 1 embodiment.

FIG. 10 shows a turbine with a stator vane 28 extending from an inner endwall 29, where the radial seal extends from below the inner diameter (ID) endwall 29 and forms a seal with a rotating rotor extending between a forward stage 25 of rotor blades and an aft stage 26 of rotor blades with a rim cavity 27 formed between the rotor blade stages and the stator vane ID endwall 29. The FIG. 1 embodiment of the seal 11 is shown in the seal slots formed within the brush seal holder 51 and 52 and the seal support 42 during relative displacement in a radial direction. The seal support 42 includes a radial inward facing seal slot 53 that opens into a brush seal holder slot 54. The seal slot 53 is much narrower than the brush seal holder slot 54. A brush seal holder 51 and 52 (which is shown as two pieces but could be a single piece) slides within the brush seal holder slot 54. A radial outward facing seal slot 55 is formed on an outer side of the brush seal holders 51 and 52. The seal 11 is secured within and slides in a radial direction within the radial inward facing seal slot 53 formed in the seal support 42 and the radial outward facing seal slot 55 formed in the brush seal holders 51 and 52. The brush seal holders 51 and 52 include a radial inward facing seal slot 56 in which a brush seal 57 is secured that makes contact with the rotor surface to form a seal across the rim cavity 27.

We claim:

1. A gas turbine engine comprising:
   a turbine with a stage of rotor blades;
   a stator vane located adjacent to the stage of rotor blades;
   an inner diameter endwall extending from the stator vane;
   a rim cavity formed between the stage of rotor blades and the stage of stator vanes and a rotor disk;
   a seal support extending from the inner diameter endwall and into the rim cavity;
   the seal support having a radial inward facing seal slot and a brush seal holder slot;
   a brush seal holder slidable within the brush seal holder slot in a radial direction;
   the brush seal holder having a radial outward facing seal slot;
   a brush seal secured to the brush seal holder and in contact with the rotor disk; and,
   a seal secured within the radial inward facing and outward facing seal slots of the seal support and the brush seal holder;
   the seal having a seal plate and an expandable member on each end that forms a seal with the radial extending seal slots.

2. The gas turbine engine of claim 1, and further comprising:
   the two radial inward facing and outward facing seal slots are of the same width and aligned in the radial direction.

3. The gas turbine engine of claim 1, and further comprising:
   the expandable member is a C-shaped seal.

4. The gas turbine engine of claim 1, and further comprising:
   the expandable member is an E-shaped seal.

5. The gas turbine engine of claim 1, and further comprising:
   the expandable member is a spring energized seal.

6. The gas turbine engine of claim 1, and further comprising:
   the expandable member is a spring loaded seal.

7. The gas turbine engine of claim 1, and further comprising:
the expandable member is a second brush seal.

8. The gas turbine engine of claim 1, and further comprising:
the expandable member includes one side that is flexible and an opposite side that is rigid.

9. The gas turbine engine of claim 8, and further comprising:
the expandable member has a circular shape with the rigid side secured to the seal plate.

10. The gas turbine engine of claim 8, and further comprising:
the expandable member has an elbow shape with the rigid side secured to the seal plate.

11. The gas turbine engine of claim 8, and further comprising:
the expandable member has a Z-shape with the rigid side secured to the seal plate.

12. A gas turbine engine comprising:
a turbine with a stage of rotor blades;
a stator vane located adjacent to the stage of rotor blades;
an inner diameter endwall extending from the stator vane;
a rim cavity formed between the stage of rotor blades and the stage of stator vanes and a rotor disk;
a seal support extending from the inner diameter endwall and into the rim cavity;
a first seal slot formed in the seal support;
a second seal slot formed in the seal support in which the first seal slot opens into;
the second seal slot being wider than the first seal slot;
a second seal holder capable of radial displacement within the second seal holder slot;
the second seal holder having a third seal slot and a fourth seal slot;
the first seal slot is a radial inward facing seal slot;
the second seal slot is a radial outward facing seal slot;
the third seal slot is a radial outward facing seal slot;
the fourth seal slot is a radial inward facing seal slot;
a first seal secured within the first seal slot and the third seal slot;
a second seal secured within the fourth seal slot; and,
the second seal forms a seal with the rotor disk.

13. The gas turbine engine of claim 12, and further comprising:
the first seal is capable of radial displacement within the first seal slot and the third seal slot.

14. The gas turbine engine of claim 12, and further comprising:
the first seal slot and the third seal slot have the same width.

15. The gas turbine engine of claim 12, and further comprising:
the first seal includes an expandable member on each end that forms a seal with the associated seal slots.

16. The gas turbine engine of claim 12, and further comprising:
the second seal is a brush seal.

* * * * *